(12) United States Patent
Barde (10) Patent No.: US 8,185,766 B2
(45) Date of Patent: May 22, 2012

(54) HIERARCHICAL POWER MANAGEMENT WITH HOT MODE

(75) Inventor: Kaushik Barde, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 12/605,290

(22) Filed: Oct. 23, 2009

(65) Prior Publication Data

US 2010/0174925 A1    Jul. 8, 2010

Related U.S. Application Data

(60) Provisional application No. 61/204,613, filed on Jan. 7, 2009.

(51) Int. Cl.
*G06F 9/455* (2006.01)
(52) U.S. Cl. ............ 713/324; 713/1; 713/2; 718/1
(58) Field of Classification Search ............ 713/1, 2, 713/324; 718/1
See application file for complete search history.

(56) References Cited

U.S. PATENT DOCUMENTS

| | | | |
|---|---|---|---|
| 7,127,579 B2 | 10/2006 | Zimmer et al. | |
| 7,370,324 B2 * | 5/2008 | Goud et al. | 718/1 |
| 7,516,336 B2 * | 4/2009 | Rothman et al. | 713/300 |
| 7,739,532 B2 * | 6/2010 | Grobman | 713/322 |
| 8,028,184 B2 * | 9/2011 | Sekiguchi et al. | 713/323 |
| 2007/0112999 A1 * | 5/2007 | Oney et al. | 711/6 |
| 2008/0010473 A1 * | 1/2008 | Harris | 713/300 |
| 2008/0141018 A1 * | 6/2008 | Tanaka et al. | 713/2 |

OTHER PUBLICATIONS

Intel Processor Vendor-Specific ACPI Interface Specification, Revision 005, Sep. 2006.
"How virtualization makes power management different" by Kevin Tian, Ke Yu, Jun Nakajima, Winston Wang, Intel Open Source Technology Center, from the Proceedings of the Linux Symposium, Jun. 2007.

\* cited by examiner

*Primary Examiner* — Thuan Du (57) ABSTRACT

Methods, systems, apparatuses and program products are disclosed for providing power/energy control.
HPM (Hierarchical Power Management) systems provide for and improve on the power management support beyond what is available in current PC notebooks and desktops.

11 Claims, 8 Drawing Sheets

HIERARCHICAL POWER MANAGEMENT WITH HOT MODE

RELATED APPLICATION

This application claims the benefit of U.S. Provisional Application Ser. No. 61/204,613, filed on Jan. 7, 2009 which is incorporated herein by this reference.

FIELD OF THE INVENTION

The present invention generally relates to personal computers and devices sharing similar architectures and, more particularly, to a system and method for managing power and energy within those devices.

BACKGROUND OF THE INVENTION

Modernly, power management support is available in current PC (Personal Computer) notebooks and desktops conformant with ACPI (Advanced Configuration Power Interface) techniques which are well known in the art. ACPI based implementations are a form of OSPM (Operating System Power Management or sometimes Operating System Power Management Policy).

OSPM uses ACPI services which are based on BIOS (Basic Input-Output System) control. Some (typically older) ACPI services are linked to Fixed HW (hardware) registers in I/O (input-output) address space—as contrasted with MM (memory mapped) address space. FFH (functional fixed hardware) is a combination of hardware with software and firmware that, taken together, provides a number of services in conformance with the ACPI specification. Power management in ACPI OSPM systems is invariably implemented by means of FSM (Finite State Machines) as are well in the ACPI arts.

ACPI OSPM does not generally take account of, nor provide for virtualized OS (operating systems), two or more of which may coexist in a hypervisor environment. Support for rich OS features in multiple VMs (Virtual Machines) is limited. This situation provides an implementation challenge (and opportunity) for hypervisors since the underlying assumption made by a typical single OS that it may safely and properly take overarching control of the hardware resources (especially as related to power management) is thereby invalidated.

Moreover, it will never be entirely satisfactory for the power and energy environment of the underlying platform to be virtualized to each OS (operating system) nor for each OS to be allowed mere pass-through access to hardware. In the former case OS efforts at power and energy management may be wasted and in the latter case the two operating systems can be expected to interfere one with the other. For example it would clearly be at least wasteful if not error inducing for a first OS to spin down a disk drive in order to save power while it is in actual use by a second OS for reading and/or writing data.

A need exists for an implementation approach that provides each of virtualized and non-virtualized hypervisor domains meaningful and useful participation in OSPM while retaining a sufficient measure of compatibility with ACPI module based implementations.

SUMMARY OF THE INVENTION

The disclosed invention includes, among other things, methods and techniques for providing power/energy controlling techniques to address the issues described above. Thus, HPM (Hierarchical Power Management) systems provide for and improve on the power management support beyond what is available in current PC notebooks and desktops.

According to an aspect of the present invention, an electronic device includes a controller, for example a processor, and a memory that is coupled to the processor. The memory includes a plurality of instructions that when executed by the processor, cause to processor to perform power management operations, for example, maintaining PMFSMs (power management finite state machines) in two or more domains under hypervisor control. One PMFSM may virtualize states for an operating system an unprivileged domain, another PMFSM may control non-virtualized power states in a privileged domain. The virtualized and non-virtualized states will from time to time coincide and at other times diverge each from the other. In some embodiments one domain is active and another is sleeping or hibernating.

In some embodiments of the invention the FSMs may conform, strictly or loosely (typically one of each) to the ACPI specification.

According to a further aspect of the invention, one FSM is in an ACPI S3 Sleep state while another FSM is in a hotter state until a transition to an ACPI S3 Sleep state occurs.

According to a still further aspect of the invention, a policy engine is provided to cause a second PMFSM (power management finite state machine) to enforce a power management policy presentation mode, power-optimized mode and Windows active mode(s). Further there may be communication between policy directing elements, the FSMs and various power-management related device drivers in the system or device.

An advantage provided by the present invention is that it enables multiple operating systems to coexist and operate in effective simultaneity without loss of effective power management and without either OS being shut out from materially participating in that power management.

Another advantage provided by the present invention is that it provides for hypervisor use without significant loss of ACPI functioning.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and in which.

For convenience in description, identical components have been given the same reference numbers in the various drawings.

DETAILED DESCRIPTION OF THE INVENTION

The description of well-known components is not included within this description so as not to obscure the disclosure or take away or otherwise reduce the novelty of the present invention and the main benefits provided thereby. An exemplary embodiment of the present invention will now be described with reference to FIGS. 1-6.

Figure 1:
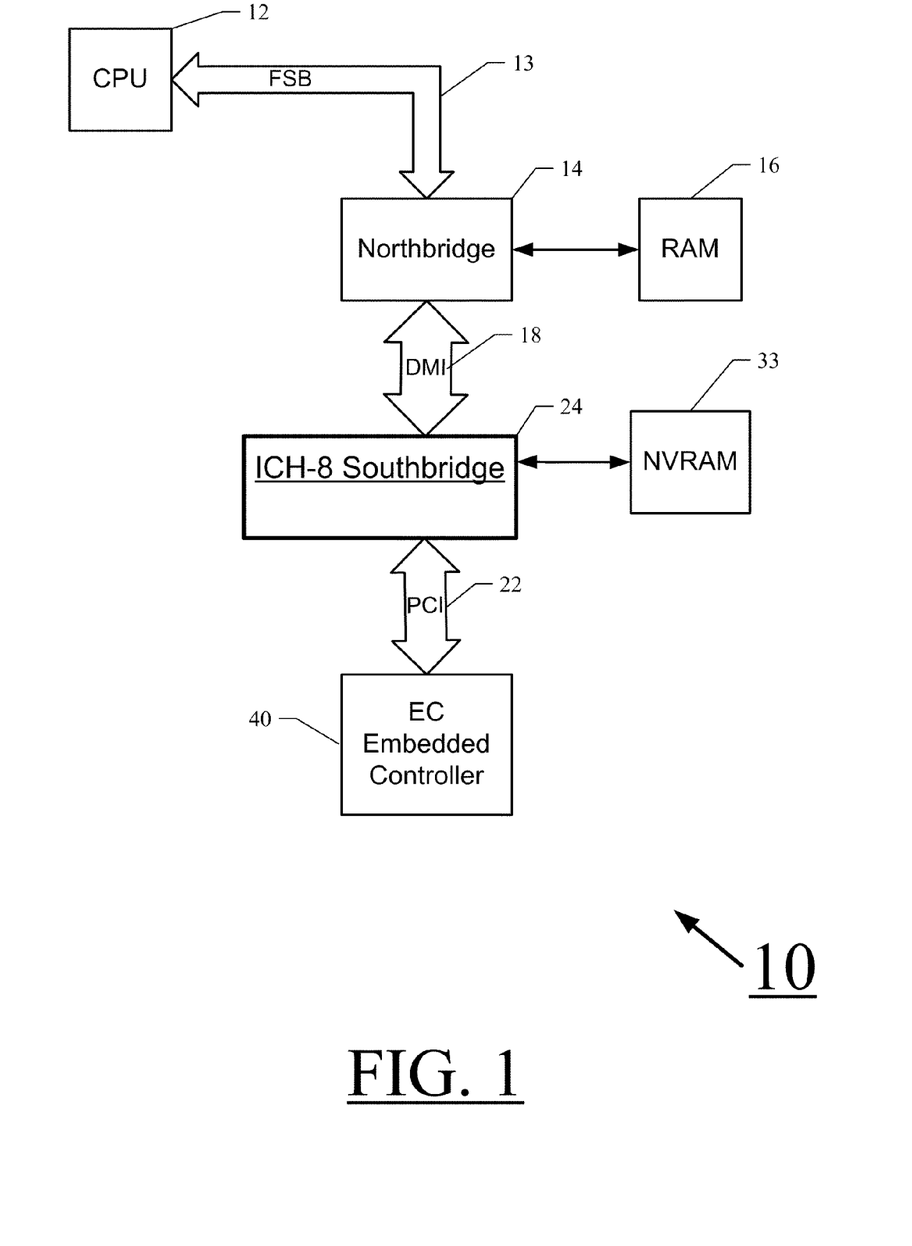
FIG. 1 is a schematic block diagram of an electronic device configured to implement the interrupt logic functions according to an exemplary embodiment of the present invention.

FIG. 1 is a schematic block diagram of an electronic device configured to implement the interrupt logic functions according to the present invention. The exemplary electronic device 10 is implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as other suitable devices for operating or interoperating with the invention. The electronic device 10 may include at least one processor or CPU (Central Processing Unit) 12, configured to control the overall operation of the electronic device 10. Similar controllers or MPUs (Microprocessor Units) are commonplace and may be used in place of the at least one processor 12.

The processor 12 may typically be coupled to a bus controller 14 such as a Northbridge chip by way of a bus 13 such as a FSB (Front-Side Bus). A Northbridge chip 14 typically provides an interface for read-write system memory 16 such as semiconductor RAM (random access memory). FSB 13 may also be used to allow bus controller 14 to control CPU features, such as effective clock rate.

The bus controller (Northbridge chip) 14 may also be coupled to a system data highway 18, for example a DMI (Direct Media Interface) in typical Intel® style embodiments. Coupled to the DMI 18 may be a Southbridge chip 24 such as an Intel® ICH8 (Input/Output Controller Hub type 8) chip. The Southbridge 24 may be connected to a PCI (peripheral component interconnect) bus 22 and an EC (Embedded controller) 40, each of which may in turn be connected to various input/output devices (not shown in FIG. 1), for example, a display, a printer, a keyboard, a mouse, a biometric reader and other suitable devices and combinations thereof. Embedded controllers are well-known in the art. The Southbridge 24 may also be connected to forms of NVRAM (non-volatile read-write memory) 33, such as a Flash Memory and a Disk Drive memory. NVRAM may be used to provide BIOS (Basic Input-Output System) and ACPI firmware and persistent data storage.

Storage recorders and communications devices including data transmitters and data receivers may also be used (not shown in FIG. 1, but see FIGS. 5 and 6) such as may be used for data distribution and software distribution in connection with distribution and redistribution of executable codes and other programs and data that may embody the parts of invention.

Figure 2:
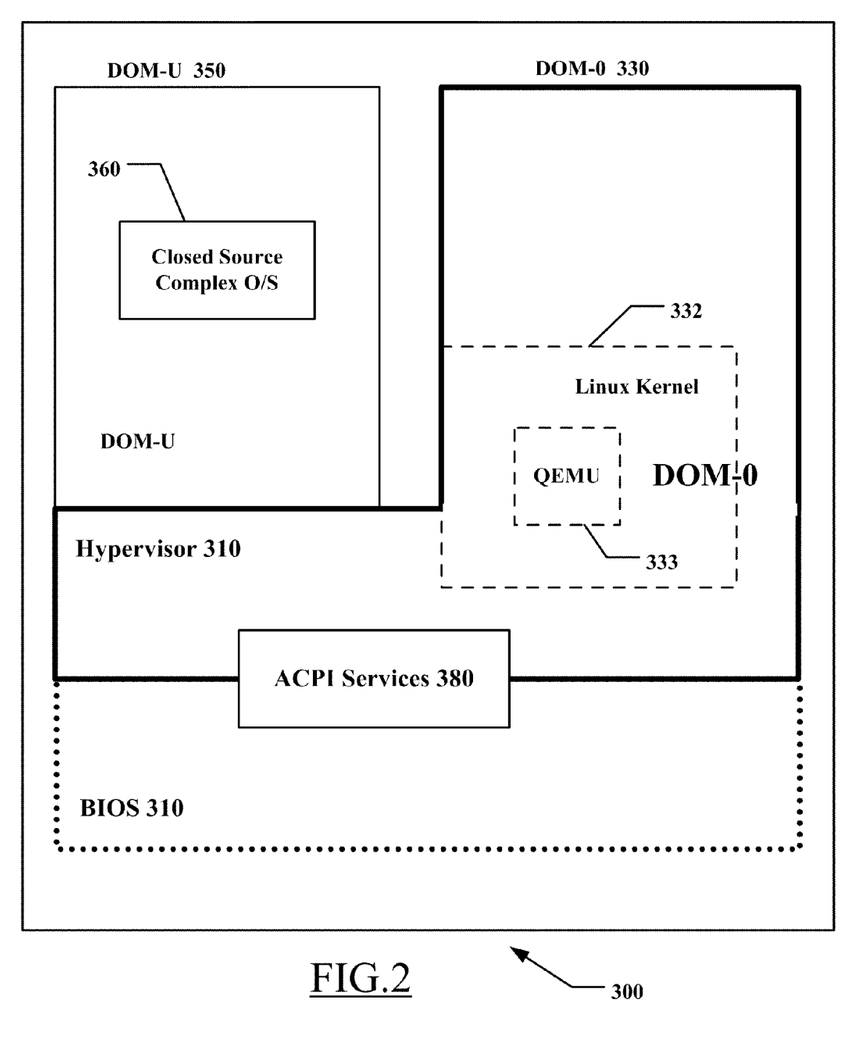
FIG. 2 is a block diagram that shows the architectural structure of a hypervisor-based system in which an exemplary embodiment of the present invention was implemented.

FIG. 2 is a block diagram that shows the architectural structure 300 of a hypervisor-based system in which an exemplary embodiment of the present invention was implemented. Embodiments of the invention may be implemented in a hypervisor environment that may use the services of a BIOS 305. An important part of a typical hypervisor environment is Dom0 330, which (in one embodiment of the invention) is built upon a modified version of a Xen® and/or Linux® software stack. Virtual Machine Dom (Domains) are well-known in the hypervisor arts. Dom0 or Domain Zero (sometimes DOM-0) is a term used in the hypervisor arts to refer to the "privileged domain", which is typically embodied as a VM (Virtual Machine) that has greater privileges than all other domains or VMs (known as DomU for "unprivileged domain").

Within Dom0 may lie a Linux® kernel program 332, upon which applications programs for running on a Linux® kernel may be found. Also within the Linux kernel 332 lies an EMU (I/O emulator subsystem) known as QEMU 333 which is a software or firmware module whose main purpose (or function) is to emulate I/O (Input-Output) operations.

Also running under the control of the hypervisor 310 is the unprivileged domain—DomU 350. Within the DomU 350 may be the Guest OS (operating system) 360. A Guest OS will typically, but not essentially, be a closed-source OS, for example, a version of the Vista® operating system which is a commercial software product of Microsoft Corporation or another suitable operating system.

Embodiments of the present invention may substantially conform to ACPI which describes and prescribes information about configuration and control of platform HW (hardware) components through ACPI's own well-known name space and Control Methods. This information may reside in various tables in AML (ACPI Machine Language) form which is interpreted by OS (operating system) ACPI driver(s) for suitable action. Although, such tables could be organized in separate functional compartments, there still exists substantial cross references within ACPI name space (whose scope is for the entire platform). Also, control methods are executed through interpretation of AML code, which has higher level of abstraction over target I/O operations.

The above factors make virtualization of ACPI functionality challenging. At least partially, as a result, the scope of ACPI implementation in embodiments of the invention at the present stage of development may be focused on PPM (Processor Power Management) and platform Sx State (ACPI Sleep State) control. ACPI functionality for the devices Dx State (ACPI Device State) management may be made available on "pass through" or generic basis in line with the actual mode of operation. ACPI functionality for virtualized subsystem components may also be covered as ACPI implementations that center on virtualization of ACPI Fixed Hardware (I/O) space. Each of these factors is significant in power (and energy) management in ACPI conformant PCs. Platform Sx states and Device Dx states are well-known in the ACPI arts.

In an embodiment of the invention, the enhanced ACPI implementation may center on virtualization of ACPI FHF (Fixed Hardware Features) especially hardware in input-output space and related to power management. ACPI FHF—both Fixed HW address space and especially FFH (Functional Fixed Hardware), are all well defined (in the ACPI specification) and are collectively a primary channel for Platform Sleep state and event notification. Similarly, Processor Power Management ACPI objects may exist on a per-VM (Virtual Machine) basis thus allowing for virtualization and/or multiplexed control of Processor P States (which mostly determine frequency scaling). Processor P States, as well as Platform Sx states and Device Dx states, are well-known in the art.

In an embodiment of the invention, Processor Cx States handling may be implemented in a pass-through or transparent mode. Thus, a processor may be placed under progressively lower power modes pursuant to detection of idling conditions by an OSPM. In such an embodiment of the invention, the actual (hardware) C state of the Processor (as contrasted with a virtualized C state as may be "seen" by OSPM) will usually be independent of which Dom (execution Domain) is active. In a typical embodiment, at a physical or package level that C state may be the highest common C state of any Domain of any of multiple Processor Cores (assuming a multiple core processor is in use). This may require that quiescent (background) Domains be successfully able to detect idle conditions and allow a yield to the lowest C State prevailing.

In an embodiment of the invention, a set of APIs may be defined for control of ACPI features under policy prescription. Thus it becomes possible to interrogate processor frequency/power range and force maximum and minimum constraints for each particular domain.

In particular, a DomU OSPM may request a lower (less power, less speed etc.) State and the hypervisor may virtualize the requested state back to the OSPM to allow it to operate consistently. But hypervisor may implement at a hardware level a different state—typically a more active State desired by the other domain, such as a Linux-based operating system that is active in Dom0.

ACPI Fixed HW space and especially corresponding FFH (Functional Fixed Hardware) codes are typically based on modified versions of hardware state tables as defined in ACPI, for example FADT (Fixed ACPI Description Table) and SSDTs (Secondary Subsystem Description Tables). ACPI Fixed HW space is the primary channel for Platform Sleep state and event notifications. In this sense the modified State tables do not strictly conform to ACPI but may be regarded as a compatible superset thereof which provide for an extended and virtualized implementation of some ACPI tables.

Similarly, Processor Power Management ACPI objects exist allowing for virtualization or multiplexed control of ACPI Processor P States for Frequency scaling. In an embodiment of the invention ACPI Processor C States are implemented in pass-through mode. In pass-through (or pass-thru) operation the underlying state is typically the same as the virtualized state and may or may not be maintained in duplicate by firmware.

Figure 3:
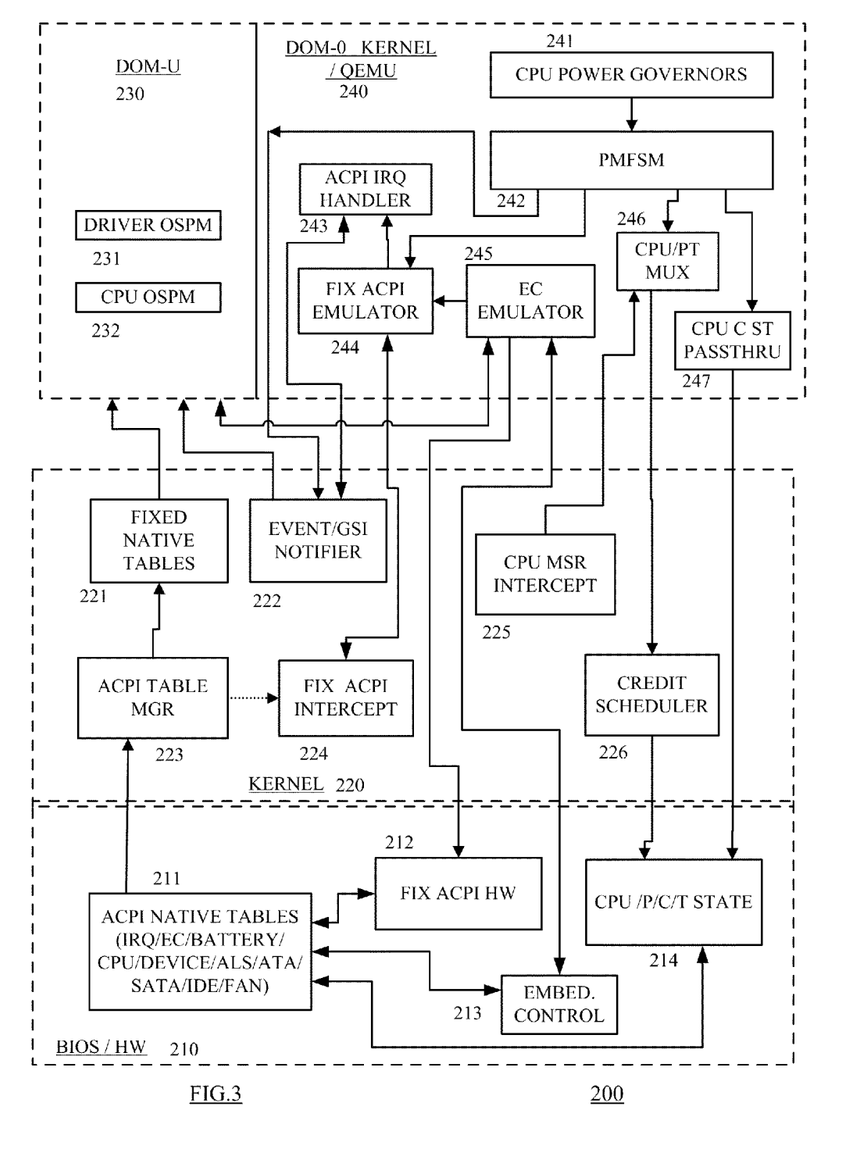
FIG. 3 is a block diagram that shows the HPM (hierarchical power management) system architecture according to an exemplary embodiment of the present invention.

FIG. 3 is a block diagram that shows a HPM (hierarchical power management) system architectural structure 200 of software and firmware components according to the present invention. FIG. 3 does not represent layout order or even juxtaposition in physical memory or memory addresses; rather, it illustrates logical software and firmware architectural interrelationships in an exemplary embodiment of the invention.

Components shown in FIG. 3 include: a DOM-U 230 comprising within it a driver OSPM 231, and a CPU OSPM 232. Device drivers and OSPM in CPU control within DomU can be, and often are, in effect a black box since the implementation is typically not open source and control of behavior is nor fully available to hypervisor implementers.

Also shown in FIG. 3 is a DOM-0 kernel comprising a component QEMU subsystem 240. Within the DOM-0 kernel/QEMU subsystem may be found software (rarely firmware) subsystem components including:—

CPU Power Governors 241, a form of device driver for hardware control of power features, PMFSM 242 (Power Management Policy Finite State Machine), a higher level control (state machine) to drive overall power management by policy prescription, ACPI IRQ (interrupt request) Handler 243 which serves to dispatch and/or virtualize IRQ interrupts, FIX ACPI EMULATOR 244 for providing surrogate ACPI information to any requesting VM, EC (embedded controller) Emulator 245, this provides virtualization and emulation of features traditionally provided by an Embedded Controller chip (for example, AAEON® AEC-6905), CPU passthru MUX (multiplexer) 246, for multiplexing pass-thru (non-virtualized) device services, CPU "C-State" Passthru 247 service (C-State is well-known in the ACPI arts to refer to CPU Power State). Pass-through (or Passthru) is well-known in the hypervisor arts.

The PMFSM 242 (Power Management Policy Finite State Machine) is particularly important subsystem; but is not especially a critical feature of the present invention. The PMFSM 242 maintains HPM (Hierarchical Power Management) policy data (such as for CPU/Battery/Device/ALS (Ambient Light Sensor)).

Further shown in FIG. 3 is a Kernel 220 such as may be embodied with the Hypercore™ BIOS (basic input-output system) product from Phoenix Technologies® Inc. Included within kernel 220 are the following components:

Fixed (modified) Native Tables 221 as extended from ACPI table definitions, primarily by multiplication for virtualization vectors, Event/GSI (Global System Interrupt) Notifier 222, a general purpose event dispatcher, Global System Interrupts are well-known in the art.

ACPI Table Manager 223, which maintains virtualized and non-virtualized versions of tables (eg FADT) as defined by the ACPI specification, Fixed (virtualized/updated) ACPI Intercept routine 224, to redirect ACPI messages generally, CPU MSR Intercept routine 225, for processor's power management model-specific registers, Credit Scheduler 226. In an exemplary embodiment, the Xen® credit scheduler program is used as the credit scheduler 226. Credit schedulers are well known in the Xen® hypervisor implementations.

Further shown in FIG. 3 is a BIOS/Hardware subsystem 210 and included within it are a number of components which are implemented largely in firmware:

ACPI Native Tables 211, these are data tables of which BIOS is aware, as inferred above and as defined in the ACPI specification.

Fix (run-time modified) ACPI hardware tables 212, to support multiple versions per VM for virtualization purposes.

Embedded Controller Support 213, basically a device driver emulator and/or virtualization subsystem for Embedded Controller chip(s).

CPU P, C and T State supporting firmware 214. P, C and T States are as defined in the ACPI specification.

A typical power management system according to an embodiment of the invention will have a number of features, including provision for: increased battery life, allowing for selection of a power mode from default setting, allowing for modification/override of power settings, providing user visual feedback for important power-related events, and orchestrating enforcement of power management policy such as by forcing a low-power state (or shutdown).

Figure 5:
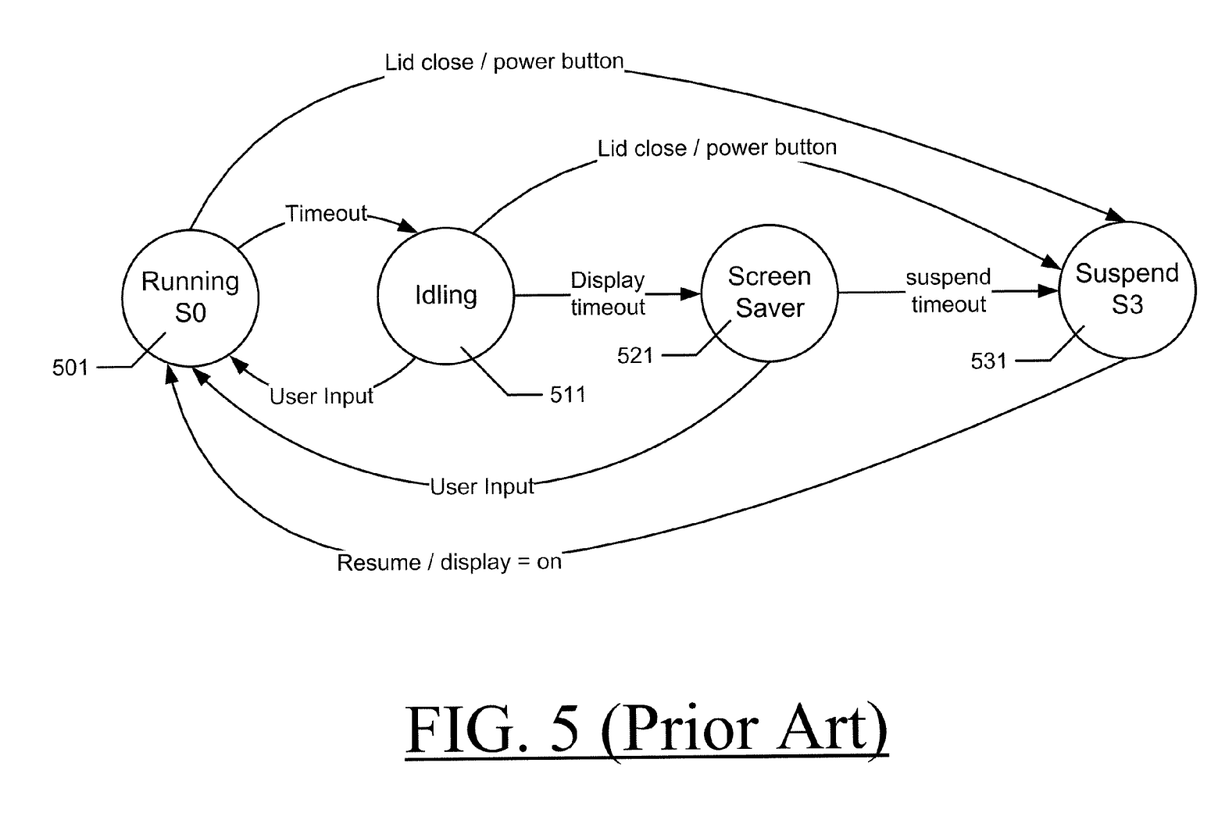
FIG. 5 shows a prior art PMFSM (Power management finite state machine) according to ACPI specifications that may be incorporated as part of an embodiment of the invention.

FIG. 5 shows a prior art PMFSM (Power management finite state machine) according to ACPI specifications and which may be incorporated as part of an embodiment of the invention. Such a PMFSM, which may conform strictly to ACPI specifications, can be virtualized into DomU—an unprivileged hypervisor domain.

Figure 6:
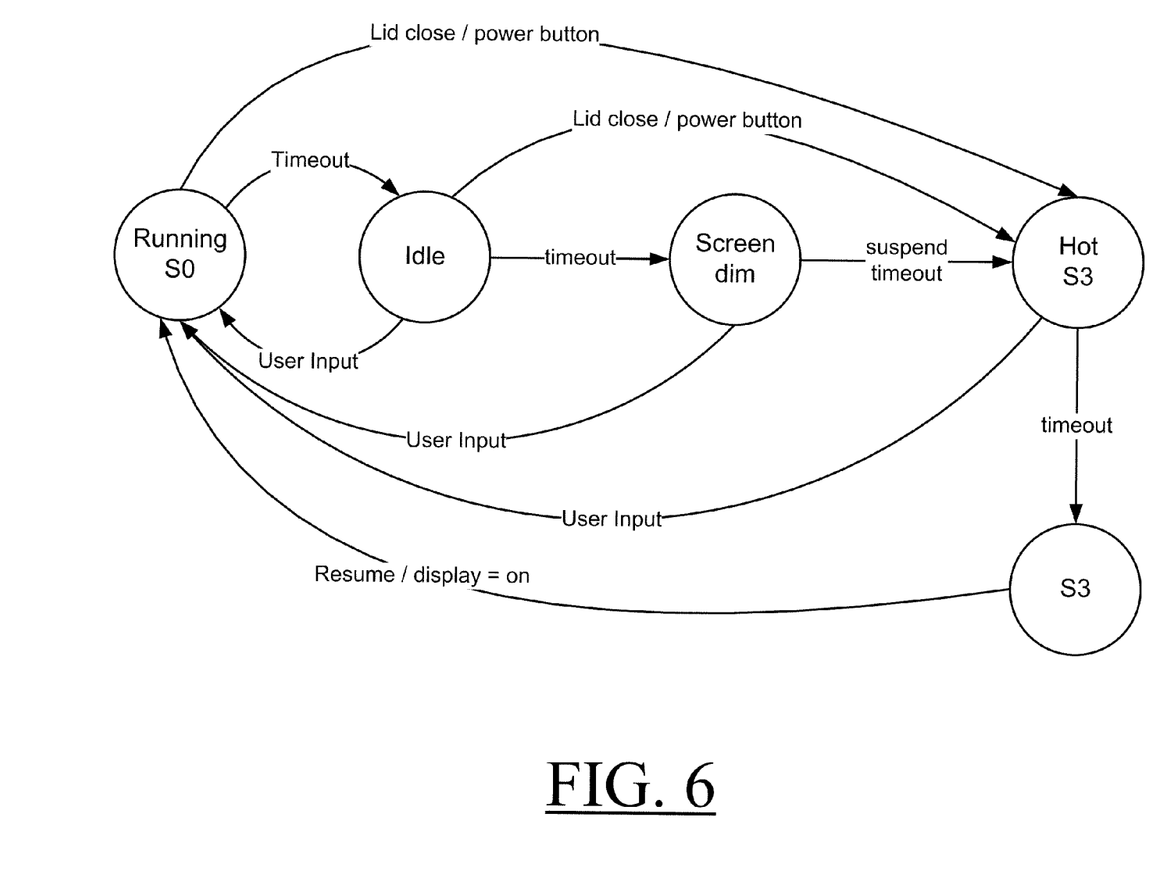
FIG. 6 shows a PMFSM (Power management finite state machine) incorporating a hot mode according to an embodiment of the invention.

FIG. 6 shows a PMFSM (Power management finite state machine) incorporating a hot mode according to an embodiment of the invention. This is a high level state machine diagram of a PMFSM that may be modeled into Dom0—the privileged hypervisor domain. It can be seen that in this example the PMFSM is effectively a compatible set or superset of an ACPI type PMFSM. It may be used to control aspects of both the Dom0 domain and of the actual computer hardware platform.

Using the two PMFSMs as shown, several primary use cases may be provided for. For example, it is expected that an exemplary computer platform, a user may be working while his/her laptop is not connected to A/C power. Furthermore, Power Management may be critical while running on rechargeable cells. Thus, a primary use case focuses on so-called battery mode. In battery mode, a user may be primarily working in Dom0 applications such as the Phoenix Hyper-Space product.

Alternatively, in battery mode, user may be primarily working in DomU. While the user is actively working in DomU operating system that operating system may be allowed control its own virtualized power management policy.

The HyperSpace product usefully includes at least one hot power mode that effectively supersets, or at least provides an upwards compatible form of, an ACPI S3 System State In one embodiment of the invention a Hot S3 state is used and is defined as follows: In Hot S3 State the display is turned off, all Dom0 processes are choked (blocked), some devices are turned off (for example disk, audio, . . . ), wifi radios may be left turned on (with a link active), and DomU may be asleep, hibernated or shutdown.

Another case may be where a user is working in Presentation Mode in Dom0. Presentation mode is well-known in the art. Presentation Mode may be a temporal state whenever it is implicitly selected by going into full-screen mode. When an implicit presentation mode ends, then the system may return to the power mode that was active prior to the switch to presentation mode. During Presentation Mode, alerts and warnings (colloquially known as toast) from applications are typically suppressed.

There may be at least two ways to enter presentation mode: particularly Explicit and Implicit, as follows: In Explicit usage: A User right-clicks on the battery icon and chooses Presentation Mode. Responsively, the amount of time that Presentation Mode may be active is determined as follows: (a). If no previous time has been chosen and remembered, then there may be a prompt for a timeout b. Otherwise, a previously saved timeout may be used.

In Implicit usage: An application may transition to a full-screen mode, or alternately an operating system (such as a Windows operating system) may inform Dom0 of being in a "presentation mode."

Figure 7:
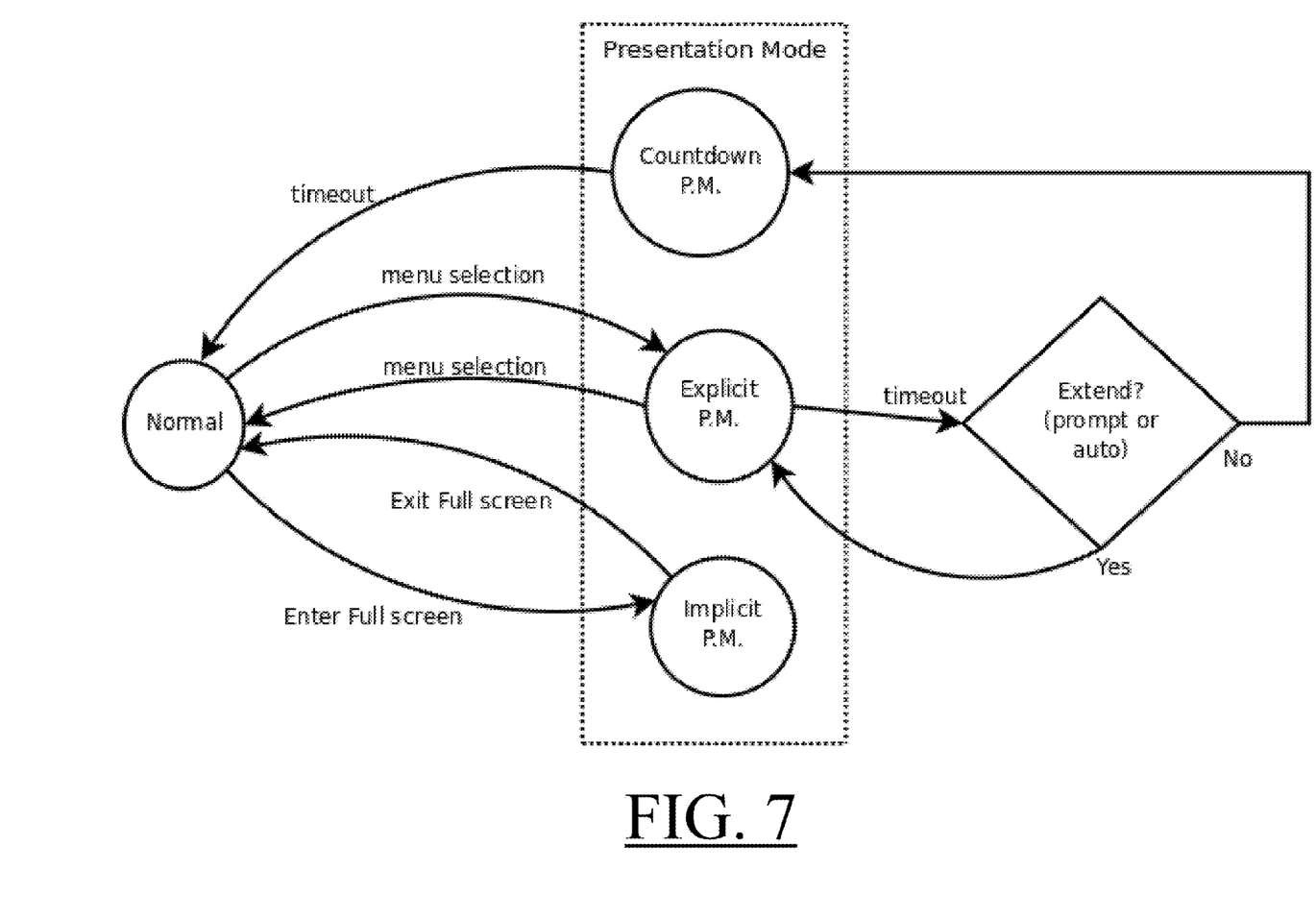
FIG. 7 shows a FSM (finite state machine) for managing a presentation mode according to an embodiment of the invention.

Some exemplary transitions into and out of presentation mode are shown in FIG. 7.

An API (application program interface) may be present to provide for communication between a PMC (power management configuration) program and a PMFSM such as via DBus messages. DBus messages are well-known in the Linux arts.

A configuration file with settings may be read and/or written by the Dom0 PMFSM. A status-update program may monitor battery, A/C (alternating current) adapter and other hardware and may send DBus notification(s) of updates. A Panel may call a PMC UI (user interface) to pass a user's selection such as from a menu.

Power management preferences may be configured in various ways, for example a user could select either a Power Optimized, Presentation or Windows Active mode. A default mode might typically be Power Optimized, otherwise known as "Normal" mode. An "Advanced" option may be provided for power users that wish to control the power management settings at a granular level.

As to DBus messages, the power management configuration and control subsystem is typically composed of several components. Two main components may be PMFSM, and a daemon process that tracks the PM (power management) states and PMC that is the GUI front-end. Additional components such as an update status may monitor underlying hardware and send updates via DBus.

Figure 4:
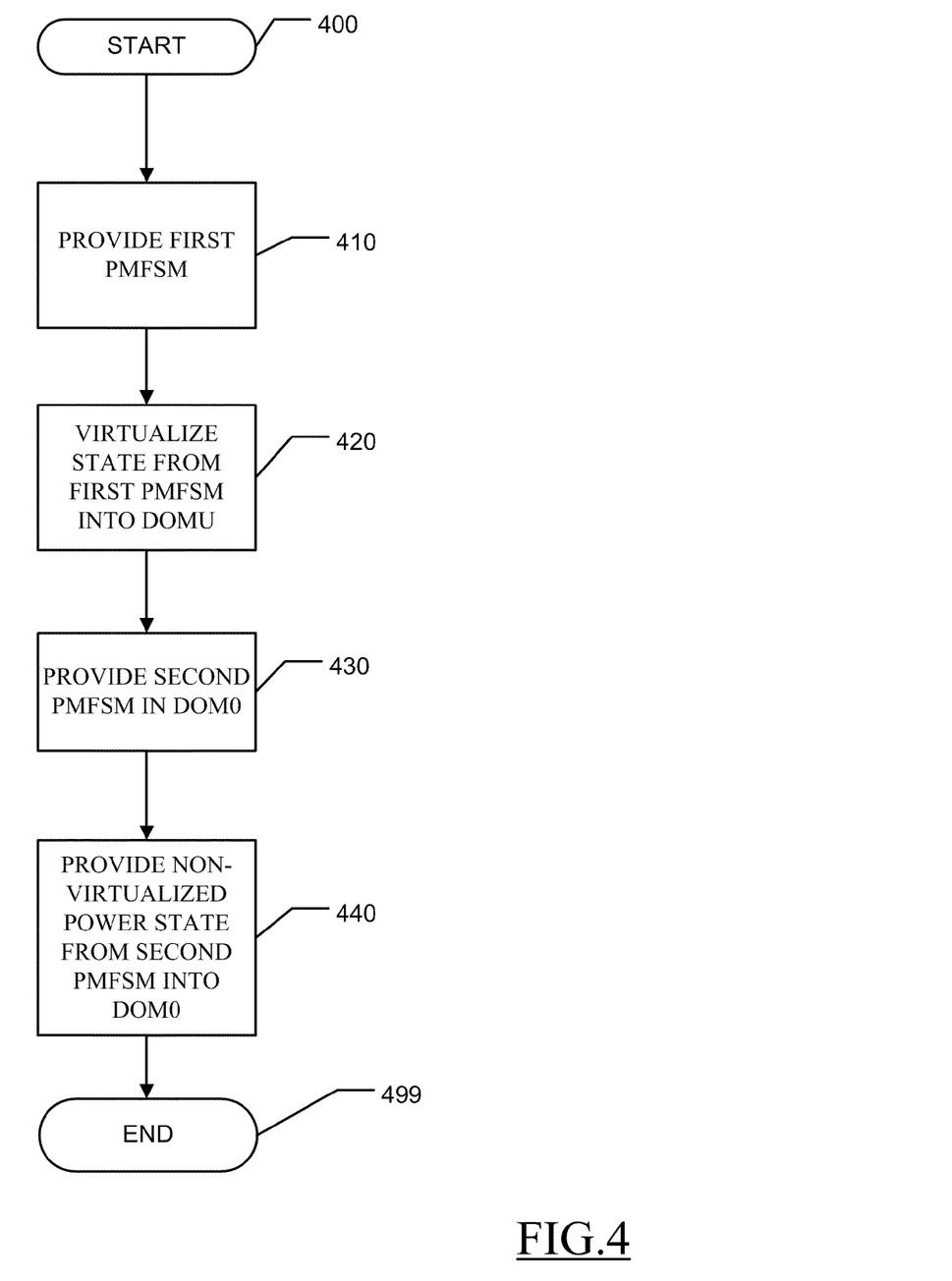
FIG. 4 is a flowchart that shows steps performed when implementing an exemplary embodiment of the present invention.

FIG. 4 is a flowchart illustrating some steps performed in implementing an approach to hierarchical power management according to the present invention. The process starts at step 400 and continues through step 499. Some of the boxes represent steps within an embodiment of the invention; others may represent acts that may be part of such steps.

At Ref. 400 the method starts. At Ref. 410 a first PMFSM is provided. In some embodiments of the invention this may be an unaltered implementation of an ACPI PMFSM for S states.

At Ref. 420 the present state of the first PMFSM is virtualized into a DomU. Thus when an operating system running in the unprivileged domain (in a typical embodiment this is likely to be a Windows operating system) makes a request that is to be serviced under ACPI protocols a response corresponding to the virtual state will typically be provided.

At Ref. 430 a second PMFSM is provided into Dom0. This may control responses into an operating system based product such a Phoenix Hyperspace product or it may also control the actual power managed state of the hardware platform. Further PMFSMs may be provided in more complicated implementations. At Ref. 440, non-virtualized power management states may be provided from the second PMFSM into Dom0. At Ref. 499, the method ends.

Figure 8:
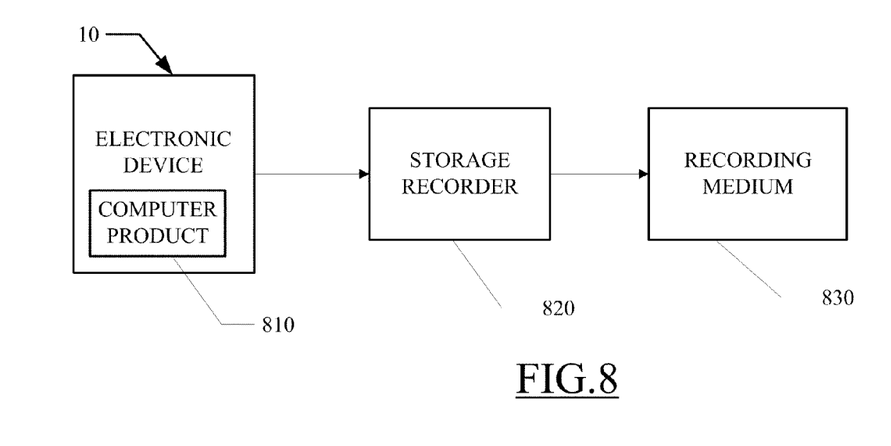
FIG. 8 shows how an exemplary embodiment of the present invention may be encoded onto a computer readable medium or media.

FIG. 8 shows how an exemplary embodiment of the present invention may be encoded onto a computer readable medium or media. As illustrated in FIG. 8, computer instructions to be incorporated into in an electronic device 10 may be distributed as manufactured firmware and/or software computer products 810 using a variety of possible computer readable media 830, for example CD (Compact Disc) or PROM (Programmable Read-Only Memory), having the instructions recorded thereon such as by using a storage recorder 820. Often in products as complex as those that deploy and implement the present invention, more than one medium may be used; both in distribution and in manufacturing relevant product. Only one medium is shown in FIG. 8 for clarity but more than one medium may be used and a single computer product may be divided among a plurality of media.

Figure 9:
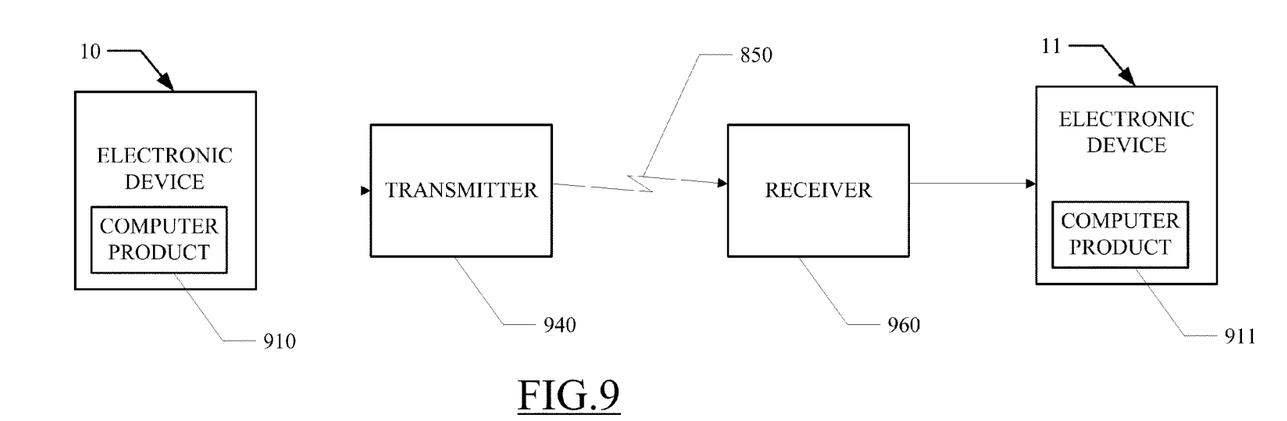
FIG. 9 shows how an exemplary embodiment of the present invention may be encoded, transmitted, received and decoded using electro-magnetic waves.

FIG. 9 shows how an exemplary embodiment of the invention may be encoded, transmitted, received and decoded using electro-magnetic waves. As illustrated in FIG. 9, additionally, and especially since the rise in Internet usage, computer program products 910 may be distributed by encoding the corresponding instructions into signals modulated as a wave. The resulting waveforms may then be transmitted by a transmitter 940, propagated as tangible modulated electromagnetic carrier waves 950 and received by a receiver 960. The carrier waves may be impressed on a metallic or non-metallic pre-formed medium, such as a copper conductor, or may be carried wirelessly through an atmospheric medium such as air. Upon reception, they may be demodulated and the signal decoded into a further version or copy of the computer product 911 in a memory or other storage device that is part of a second electronic device 11 and typically similar in nature to electronic device 10. Other topologies and/or devices, for example, Internet Protocol routers and cables thereto may also be used to construct alternative embodiments of the present invention as is well-known.

The embodiments described above are exemplary rather than limiting and the scope and bounds of the present invention should be determined from the claims. Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of managing a computing platform comprising:
    maintaining a first PMFSM (power management finite state machine);
    virtualizing a first power state within the first PMFSM into a first operating system running in an unprivileged hypervisor domain;
    maintaining a second PMFSM running in a privileged hypervisor domain; and
    providing a second power state within the second PMFSM into a second operating system running in the privileged hypervisor domain,
    wherein a PMFSM selected from the first and the second PMFSM provides a power management policy to provide mutually different first and second power states.

2. The method of claim 1 wherein:
    the first PMFSM (power management finite state machine) provides S-states (Sleep states) that conform to an ACPI (Advanced Configuration and Power Interface).

3. The method of claim 2 wherein:
    the first and the second PMFSMs (power management finite state machines) operate cooperatively so that the first PMFSM is in an ACPI S3 Sleep state while the second PMFSM is in a hotter state until a transition of the second PMFSM to the ACPI S3 Sleep state occurs.

4. The method of claim 1 further including:
    providing a policy engine to cause the second PMFSM (power management finite state machine) to enforce a power management policy.

5. The method of claim 4 wherein:
    the policy engine comprises a presentation mode criterion.

6. The method of claim 4 wherein:
    the policy engine provides for a presentation mode, a power-optimized mode and a Windows active mode.

7. The method of claim 1 wherein the first and the second PMFSMs (power management finite state machines) communicate with device drivers.

8. The method of claim 7 wherein the first and the second PMFSMs (power management finite state machines) communicate with device drivers by a DBus.

9. The method of claim 8 wherein the second PMFSM (power management finite state machine) provides for a state compatible with ACPI S3 (Advanced Configuration and Power Interface Sleep State 3) wherein a display is turned off, at least one wireless device is turned on and a state selected from a list consisting of an asleep state, a hibernated state and a shutdown state is virtualized into the unprivileged domain.

10. A computer program product comprising:
    at least one non-transitory computer-readable medium having instructions encoded therein, the instructions when executed by at least one processor cause said at least one processor to:
    maintain a first PMFSM (power management finite state machine);
    virtualize a first power state within the first PMFSM into a first operating system running in an unprivileged hypervisor domain;
    maintain a second PMFSM running in a privileged hypervisor domain; and
    provide a second power state within the second PMFSM into a second operating system running in the privileged hypervisor domain,
    wherein a PMFSM selected from the first and the second PMFSM provides a power management policy to provide mutually different first and second power states.

11. An electronic device comprising:
    a controller; and
    a memory having instructions encoded therein, the instructions when executed by the controller cause said controller to:
    maintain a first PMFSM (power management finite state machine);
    virtualize a first power state within the first PMFSM into a first operating system running in an unprivileged hypervisor domain;
    maintain a second PMFSM running in a privileged hypervisor domain; and
    provide a second power state within the second PMFSM into a second operating system running in the privileged hypervisor domain,
    wherein a PMFSM selected from the first and the second PMFSM provides a power management policy to provide mutually different first and second power states.

* * * * *